United States Patent
Ottestad

[19]

[11] Patent Number: 5,490,539
[45] Date of Patent: Feb. 13, 1996

[54] PRESSURE REGULATOR FOR MAINTAINING A STABLE FLOW LEVEL OF A FLUID

[75] Inventor: Nils T. Ottestad, Tønsberg, Norway

[73] Assignee: Ottestad Breathing Systems AS, Norway

[21] Appl. No.: 244,451

[22] PCT Filed: Nov. 24, 1992

[86] PCT No.: PCT/NO92/00185

§ 371 Date: Oct. 21, 1994

§ 102(e) Date: Oct. 21, 1994

[87] PCT Pub. No.: WO93/11383

PCT Pub. Date: Jun. 10, 1993

[30] Foreign Application Priority Data

Nov. 25, 1991 [NO] Norway ................................... 914592

[51] Int. Cl.$^6$ ................................................. G05D 7/01
[52] U.S. Cl. ........................................ 137/486; 137/489.5
[58] Field of Search ................................ 137/486, 489.5

[56] References Cited

U.S. PATENT DOCUMENTS

| | | | |
|---|---|---|---|
| 2,012,978 | 9/1935 | Veenschoten | 137/486 |
| 3,254,662 | 6/1966 | Wagner | 137/489.5 X |
| 3,719,321 | 3/1973 | McNabney | 137/486 X |
| 4,364,409 | 12/1982 | Jones | 137/486 |
| 4,413,648 | 11/1983 | Walters et al. | 137/486 |
| 4,813,447 | 3/1989 | Ichiryu et al. | 137/486 |
| 5,036,877 | 8/1991 | Distler et al. | 137/489 |

FOREIGN PATENT DOCUMENTS

| | | |
|---|---|---|
| 349356 | 9/1972 | Sweden. |
| 349158 | 9/1972 | Sweden. |
| 442455 | 12/1985 | Sweden. |
| 1511280 | 5/1978 | United Kingdom. |

*Primary Examiner*—Stephen M. Hepperle
*Attorney, Agent, or Firm*—Harness, Dickey & Pierce

[57] ABSTRACT

A flow regulator for maintaining a stable rate of flow of a fluid in a flow channel (2), comprising a flow-actuating element (4) which is movable under the influence of a pressure drop in the fluid flow, and a throttle valve (10) for regulating the fluid flow under the influence of said element (4). The fluid-actuated element (4) constitutes a control element for a servo means (11) comprising a pilot valve (17) for controlling the movement of a drive means (12) coupled to a valve body (19) in the throttle valve (10), and which, by means of the servo means (11), is arranged to be moved in a smooth manner independently of sudden changes in the fluid flow. The control element is influenced by a prestressed spring (9) acting in the opposite direction to the flow direction, so that the control element (4) is moved in the flow direction only when the rate of flow exceeds a preselected level.

20 Claims, 2 Drawing Sheets

PRESSURE REGULATOR FOR MAINTAINING A STABLE FLOW LEVEL OF A FLUID

BACKGROUND AND SUMMARY OF THE INVENTION

The invention relates to a flow regulator for maintaining a stable rate of flow of a fluid in a flow channel, comprising a flow-actuated element which is movable under the influence of a pressure drop in the fluid flow, and a throttle valve for regulating the fluid flow under the influence of said element.

A typical field of use for such a regulator is in connection with hydraulic pumps for unloading cargo tanks for oil or the like on e.g. a tanker, wherein the pumps are connected to and driven from a ring conduit transporting hydraulic liquid under a very high pressure, more specifically about 300 bars (30 000 kPa). Such applications utilize pumps of very large power, on the order of megawatts. In front of each pump a flow regulator is used for ensuring a stable liquid supply for the operation of the pumps in order to prevent them from "running riot" when they are about to empty the reservoir and start sucking air. Such a situation with overspeed of the pump will result in damage thereof in the course of a very short time.

Different types of regulators have been developed for this purpose. Such regulators operate to restrict or throttle the supply of hydraulic liquid as soon as changes occur in the operating conditions which may have a tendency to increase the liquid supply in the flow channel to the pump motor. The known types of flow regulators are, however, encumbered with problems in that they are complicated and in that they absorb a considerable amount of energy under normal operating conditions (i.e. with a little throttling of the liquid flow). This is a consequence of the fact that a considerable pressure drop has to be established across these known regulators in order to produce the forces used for stabilizing the through-put. With a conduit pressure of about 300 bars, it may for example be the question of a pressure drop of about 10 bars for each regulator. This in reality involves an energy loss of the order of 30 kW, which results in a substantial heating of the oil; something which in turn requires artificial cooling. It is obvious that this is economically unfavorable and also renders as the system structure more complicated.

Thus, it is an object of the invention to provide a flow regulator which is able to operate with a substantially reduced pressure drop in the flow channel in relation to the known regulators.

A further object is to provide such a flow regulator giving a more sensitive regulation with a short response time and a smoother response than what is achieved with the regulators according to the prior art.

The above-mentioned objects are achieved with a flow regulator of the introductorily stated type which, according to the invention, is characterized in that the flow-actuated element constitutes a control element for a servo means comprising a pilot valve for controlling the movement of a drive means coupled to a valve body in the throttle valve, and which, by means of the servo means, is arranged to be moved in a smooth manner independently of sudden changes in the fluid flow, the control element being arranged to be moved in the flow direction only when the rate of flow exceeds a preselected level.

In the flow regulator according to the invention, the flow-actuated element operates as a control element in a servo control of the throttle valve. By means of this technique there is achieved an efficient stabilization of the fluid flow with a very moderate pressure drop across the regulator. It is estimated that the pressure drop may be reduced to approximately 1 bar; i.e. to $\frac{1}{10}$ of the pressure drop required in the regulators according to the prior art. The servo control absorbs some energy, but this is quite inconsequential compared to the energy lost in the existing solutions.

The flow regulator according to the invention distinguishes itself in that it has a small energy demand under normal operating conditions, and in that it maintains a stable flow level even if sudden changes in the operating conditions occur. By, inter alia, designing the throttle valve such that an efficient balancing of the pressure influencing the valve body in the throttle valve is obtained, the flow control functions well with a very moderate use of servo. Thus, by means of the utilized technique, a very "smooth" and precise flow regulation has been achieved, even with a fluid pressure of up to 300 bars.

BRIEF DESCRIPTION OF THE DRAWINGS

The invention will be further described below in connection with an exemplary embodiment with reference to the drawings, wherein.

DESCRIPTION OF THE PREFERRED EMBODIMENT

In the following, the flow regulator according to the invention will be described in connection with the regulation of a liquid flow, but it is emphasized that the solution is suitable for any fluid.

Figure 1:
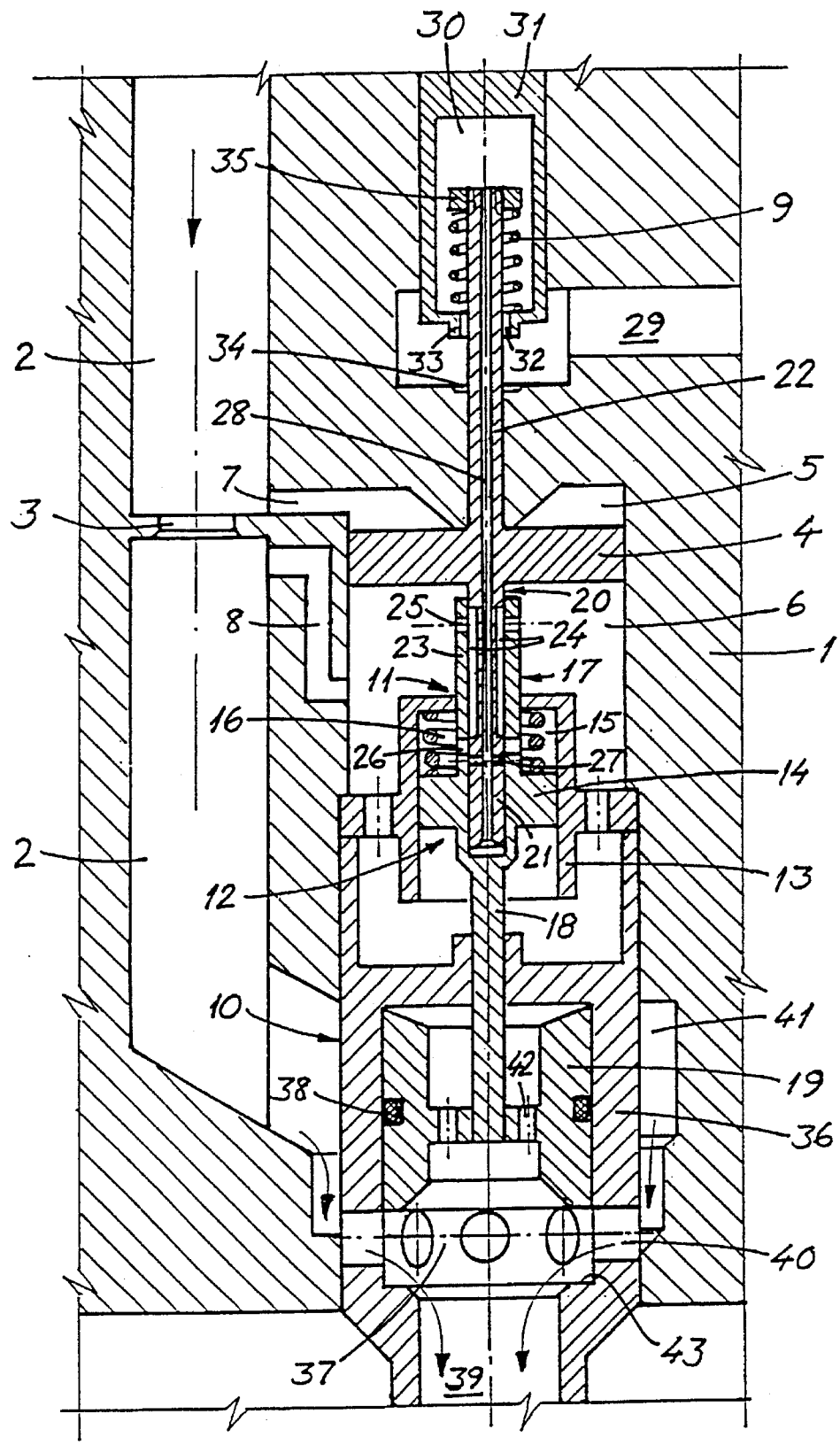
FIG. 1 shows a longitudinally sectioned view of a flow regulator according to the invention.

As appears from FIG. 1, the shown embodiment of the flow regulator comprises a body 1 containing a flow channel 2 and in which the regulator elements are built in as shown next to the flow channel. In the flow channel 2, there is provided a pressure-drop producing means in the form of an orifice 3 for the generation of a flow-dependent force for actuating or influencing the flow-actuated element of the regulator. In the illustrated embodiment, this element is a piston 4 which is movable in a cylindrical cavity which is divided by the piston into a first chamber 5 and a second chamber 6. The first chamber 5 is connected to the channel 2 through a port 7 upstream of the orifice 3, and the second chamber 6 is connected to the channel 2 through a port 8 downstream of the orifice 3. Thus, the pressure in the chamber 6 is reduced in relation to the pressure in the chamber 5 with a value corresponding to the pressure drop which is generated across the orifice 3 and which in turn is dependent on the rate of flow (the flow level) in the channel 2. Thus, the piston 4 is influenced by a force seeking to move the piston in the flow direction. However, the piston 4 is also influenced by a suitably prestressed spring 9 counteracting the first-mentioned force on the piston 4, so that the liquid flow has to exceed a certain level before the piston 4 is moved in the flow direction. The arrangement in connection with the spring 9 will be further described later.

The regulator comprises a throttle valve 10 for regulating the liquid flow in the channel 2 under the influence of the piston 4, the piston constituting a control element for a servo means 11 for controlling movement of a drive means 12 for operating the throttle valve.

As shown in FIG. 1, the drive means 12 is arranged in the second chamber 6 and comprises a piston housing 13 which is fixedly mounted in the body 1, and a drive piston 14 which, together with the piston housing, defines a third chamber 15 on the side of the piston 14 facing away from the throttle valve 10. The piston housing 13 is formed from a cup-shaped body which is outwardly open on the side of the drive piston 14 facing the throttle valve 10, so that the piston at this side is influenced by the pressure in the second chamber 6. On its opposite side the piston 14 is influenced by the force from a suitably prestressed drive spring 16 and by the pressure from liquid which has been supplied to the third chamber 15 by means of the pilot valve 17 of the servo means 11. The piston 14 is fixedly connected through a piston rod 18 to a valve body 19 in the throttle valve 10.

The pilot valve 17 of the servo means 11 comprises a center shaft 20 arranged on the control element piston 4 and consisting of a pair of members 21, 22 extending at opposite sides of the piston, and a guiding sleeve 23 arranged for the center shaft 20 which is connected to the drive piston 14 and extends outside of the third chamber 15 towards the piston 4. The center shaft 20 on its surface is provided with a number of longitudinally extending channels 24 which, at one end, communicate with the second chamber 6 through first ports 25 through the wall of the guiding sleeve 23, and which, at their other end, can be brought into communication with the third chamber 15 through second ports 26 in the wall of the guiding sleeve. Further, the center shaft 20 comprises a transverse passage 27 which can be brought into communication with the second ports 26 of the guiding sleeve 23 when these are shut off from the channels 24, and which communicates with a passage 28 extending through the center shaft 20 in the longitudinal direction thereof and communicates with an outlet 29 for the escape of liquid from the third chamber 15. This outlet may open into the external ambient pressure of 1 atmosphere.

The longitudinal passage 28 of the center shaft 20 extends as shown throughout the center shaft and opens at opposite ends thereof, so that it is pressure-balanced in the axial direction.

The control function of the pilot valve consists in that it controls liquid to or from the third chamber 15 in such a manner that the drive piston 14 at any time is forced to follow the movement of the control element piston 4 and therewith the movement of the center shaft 20. As will be understood, the drive piston 14 is moved in one or the other direction when the resulting force from the drive spring 16 and the liquid pressure in the third chamber 15 exceeds or becomes less than the force influence on the piston because of the pressure in the second chamber 6.

By the servo means one achieves that the drive piston 14 is moved in a smooth manner even if a sudden pressure change occurs in the liquid flow in the channel 2, consequently a sudden movement of the flow-actuated piston 4 will result in movement of the drive piston 14 only when the chamber 15 is filled or emptied sufficiently for achieving the necessary differential pressure across the piston 14.

Figure 2:
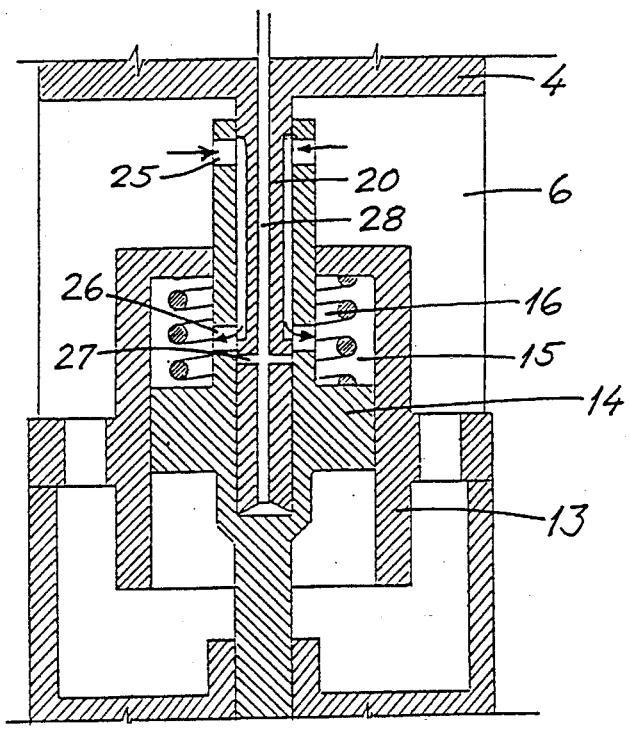
FIGS. 2 and 3 show enlarged sectional views of the servo means with the pilot valve in FIG. 1 in two different operational positions.
Figure 3:
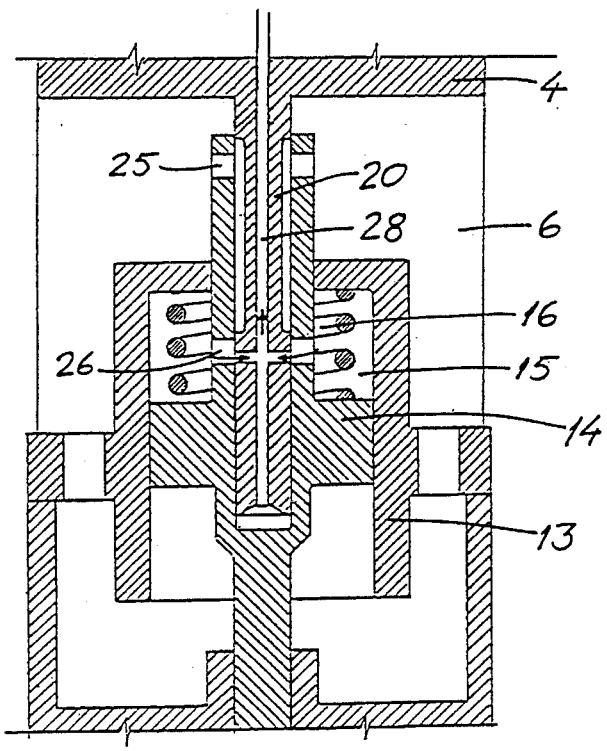

The operating principle of the pilot valve is further in FIGS. 2 and 3 wherein the shown arrows indicate the liquid flow in the servo mechanism. FIG. 2 shows the liquid flow when the piston 4 and the center shaft 20 are moved downwards and the chamber 15 is filled with liquid so that the drive piston 14 is moved correspondingly downwards, and FIG. 3 shows the liquid flow when the piston 4 is moved upwards and the chamber 15 is emptied of liquid so that the drive piston 14 is moved correspondingly upwards.

As shown in FIG. 1, the upper part 22 of the center shaft 20 at the outlet 29 is introduced into a cavity 30 in a closing body 31 which in a manner not further shown, is adjustable in the longitudinal direction of the center shaft in the body 1. The cavity 30 has an outlet opening 32 which is directed towards the piston 4 and is defined by a collar 33 which is arranged to cooperate with an annular seat 34 around the center shaft. The outlet 29 thereby may be closed in connection with shutting-off of the throttle valve 10, as described below.

The above-mentioned prestressing spring 9 for preadjustment of the flow level through the regulator is, as shown, restrained between the outlet end of the closing body 31 and a support member 35 at the end of the center shaft 20, so that the prestressing force of the spring 9 is reduced by movement of the closing body 31 in the direction towards the seat 34.

The throttle valve 10 of the regulator comprises a housing 36 having a cylindrical cavity 37 wherein the valve body 19 is slidably arranged in a sealing manner. In the shown embodiment, a sealing ring 38 is arranged between the valve body 19 and the adjacent housing wall. However, this sealing ring may be omitted with an accurate adaptation and polishing of the sliding surfaces. The cavity 37 merges into the outlet opening 39 of the regulator, the downstream end of the cavity communicating with the flow channel 2 through a number of radial ports 40 symmetrically arranged in the peripheral wall of the housing 36, and through an annular space 41 arranged in the body 1 around the housing 36.

As shown, the valve body 19 is provided with through-going axial channels 42 for equalizing the pressure difference between the end surfaces of the valve body. By the axial movement of the valve body there is obtained a stepless and not very force-demanding change of the effective flow cross-section through the radially arranged ports 40. When the flow regulator is completely closed, the lower edge of the valve body 19 is pressed against a seat 43 in the valve housing 36. This seat is disposed at a certain distance from the ports 40 for minimizing pressure effects when the valve body 19 causes a considerable throttling of the liquid flow.

The through-put of the regulator may be adjusted to a desired level by establishing a given prestressing of the spring 9. The prestressing of the spring is dependent on the position of the closing body 31 which in this context may also be designated "control cylinder". This may be positioned by manual or pneumatic control according to known technique. In FIG. 1, the control cylinder is raised to its uppermost position whereby the regulator is adjusted to maximum through-put. Further, it may be assumed that the liquid flow through the system corresponds to the set level. The force trying to press the piston 4 downwards, then is equal to and oppositely directed in relation to the tension of the spring. In this situation the throttle valve body 19 is maintained in a position allowing full through-put or through-flow via the ports 40 of the throttle valve 10.

If the external conditions change and the liquid flow starts increasing, the piston 4 immediately will be pressed downwards and quickly see to it that the throttle valve 10 enters into operation and thereby maintains the flow level. An important property of the illustrated embodiment is that the piston 4 is not influenced by forces which may create instability in the liquid regulation. Thus, importance is attached to balancing undesired pressure effects on the center shaft. All ports therefore are symmetrically placed and, as mentioned, the through passage of the center shaft provides for eliminating undesired axial forces.

When the control cylinder 31 is positioned in its lowermost position, the collar 33 rests sealingly against the seat 34, so that the outlet 29 is closed. In this situation liquid can not be discharged from the chamber 15, and this is filled gradually with liquid until the spring 16 has pressed the throttle valve body 19 downwards against the seat 43, so that the throttle valve is closed.

In the illustrated embodiment, the valve body 19 is disposed at the inside of the ports 40 in the valve housing 36. In an alternative embodiment (not shown) the valve body may be disposed at the outside of the ports, but this would entail an undesired dimensional increase of the movable parts. It is also conceivable to place the flow-actuated piston 4 in the liquid flow in the flow channel, and thereby avoid the special pressure-drop generating means 3. It has been found, however, that this gives a somewhat poorer stability.

I claim:

1. A flow regulator for maintaining a stable rate of flow of a fluid in a flow channel (2), comprising a flow-actuated element (4) which is movable under the influence of a pressure drop in the fluid flow, and a throttle valve (10) for regulating the fluid flow under the influence of said element (4), characterized in that flow-actuated element (4) constitutes a control element for a servo means (11) comprising a pilot valve (17) for controlling the movement of a drive means (12) coupled to a valve body (19) in the throttle valve (10) and which, by means of the servo means (11), is arranged to be moved in a smooth manner independently of sudden changes in the fluid flow, said control element (4) being arranged to be moved in the flow direction only when the rate of flow exceeds a preselected level and being influenced by a prestressed spring (9) acting in the opposite direction to the flow direction, the prestressing force is adjustable for setting of the preselected flow level, said control element (4) including a piston forming a partition between a first chamber (5) connected to the flow channel (2) upstream of a pressure-drop orifice (3) in the channel, and a second chamber (6) connected to the channel (2) at the downstream side of the orifice (3), and that the drive means (12) is arranged in the second chamber (6) and comprises a piston housing (3) and a drive piston (14) which together defines a third chamber (15) at the side of the piston (14) facing away from the throttle valve (10), the third chamber (15) by means of the pilot valve (17) being arranged to be filled with fluid from the second chamber (6) or emptied of fluid in dependence on the movement of the control element (4), the drive piston (14) at the side facing the throttle valve (10) being influenced by the pressure in the second chamber (6), and on the opposite side being influenced by the force from a prestressed drive spring (16) and by the pressure from the fluid supplied to the third chamber (15), so that the drive piston (14) is moved when the resulting force from the drive spring (16) and the fluid pressure in the third chamber (15) exceeds or becomes less than the force influence from the pressure in the second chamber (6).

2. A flow regulator according to claim 1, characterized in that the pilot valve (17) comprises a center shaft (20) arranged on the control element piston (4) and a guiding sleeve (23) arranged for the center shaft and which is connected to the drive piston (14) and extends outside the third chamber (15), the center shaft (20) on its surface being provided with a number of longitudinally extending channels (24) which, at one end, communicate with the second chamber (6) through first ports (25) through the wall of the guiding sleeve (23), and which at their other end can be brought into communication with the third chamber (15) through second ports (26) in the wall of the guiding sleeve (23), and the center shaft (20) further comprising a transverse passage (27) which can be brought into communication with the second ports (26) of the guiding sleeve (23) when these are shut off from the channels (24), and which communicates with a passage (28) extending through the center shaft (20) in the longitudinal direction thereof and communicating with an outlet (29) for escape of fluid from the third chamber (15).

3. A flow regulator according to claim 2, characterized in that the longitudinally extending passage (28) of the center shaft (20) extends throughout the center shaft (20) and opens at opposite ends thereof, so that the shaft is pressure-balanced in the axial direction.

4. A flow regulator according to claim 2, characterized in that the end of the center shaft (20) at said outlet (29) is inserted into a cavity (30) in a closing body (31) which is adjustable in the longitudinal direction of the center shaft (20), the cavity (30) having an outlet opening (32) which is directed towards the control element piston (4) and is arranged to cooperate with a seat (34) in order to close the outlet (29) to cause closing of the throttle valve (10).

5. A flow regulator according to claim 4, characterized in that the prestressing spring (9) is constrained between the outlet end of the closing body (31) and a support member (35) at the end of the center shaft (20), so that the prestressing force of the spring (9) is reduced with movement of the closing body (31) in the direction towards said seat (34).

6. A flow regulator according to claim 5 CHARACTERIZED IN that the drive piston (14) of the drive means (12) through a piston rod (18) is directly connected to the valve body (19) of the throttle valve (10).

7. A flow regulator according to claim 6, CHARACTERIZED IN that the throttle valve (10) comprises a housing (39) having a cylindrical cavity (37) wherein the valve body (19) is slidably arranged and which merges into the outlet opening (39) of the regulator, the downstream end of the cavity (37) communicating with said flow channel (2) through a number of radial ports (40) which are symmetrically arranged in the peripheral wall of the housing (36).

8. A flow regulator according to claim 7, CHARACTERIZED IN that the valve body (19) of the throttle valve (10) is provided with through-going axial channels (42) for equalizing the pressure difference between the end surfaces of the valve body (19).

9. A flow regulator for maintaining a stable rate of flow of a fluid in a flow channel (2), comprising a flow-actuated element (4) which is movable under the influence of a pressure drop in the fluid flow, and a throttle valve (10) for regulating the fluid flow under the influence of said element (4), characterized in that flow-actuated element (4) constitutes a control element for a servo means (11) comprising a pilot valve (17) for controlling the movement of a drive means (12) coupled to a valve body (19) in the throttle valve (10), and which, by means of the servo means (11), is arranged to be moved in a smooth manner independently of sudden changes in the fluid flow, said control element (4) being arranged to be moved in the flow direction only when the rate of flow exceeds a preselected level, said control element (4) including a piston forming a partition between a first chamber (5) connected to the flow channel (2)

upstream of a pressure-drop orifice (3) in the channel, and a second chamber (6) connected to the channel (2) at the downstream side of the orifice (3), and that the drive means (12) is arranged in the second chamber (6) and comprises a piston housing (3) and a drive piston (14) which together defines a third chamber (15) at the side of the piston (14) facing away from the throttle valve (10), the third chamber (15) by means of the pilot valve (17) being arranged to be filled with fluid from the second chamber (6) or emptied of fluid in dependence on the movement of the control element (4), the drive piston (14) at the side facing the throttle valve (10) being influenced by the pressure in the second chamber (6), and on the opposite side being influenced by the force from a prestressed drive spring (16) and by the pressure from the fluid supplied to the third chamber (15), so that the drive piston (14) is moved when the resulting force from the drive spring (16) and the fluid pressure in the third chamber (15) exceeds or becomes less than the force influence from the pressure in the second chamber (6).

10. A flow regulator according to claim 9, characterized in that the pilot valve (17) comprises a center shaft (20) arranged on the control element piston (4) and a guiding sleeve (23) arranged for the center shaft and which is connected to the drive piston (14) and extends outside the third chamber (15), the center shaft (20) on its surface being provided with a number of longitudinally extending channels (24) which, at one end, communicate with the second chamber (6) through first ports (25) through the wall of the guiding sleeve (23), and which at their other end can be brought into connection with the third chamber (15) through second ports (26) in the wall of the guiding sleeve (23), and the center shaft (20) further comprising a transverse passage (27) which can be brought into connection with the second ports (26) of the guiding sleeve (23) when these are shut off from the channels (24), and which communicates with a passage (28) extending through the center shaft (20) in the longitudinal direction thereof and communicating with an outlet (29) for escape of fluid from the third chamber (15).

11. A flow regulator according to claim 10, characterized in that the longitudinally extending passage (28) of the center shaft (20) extends throughout the center shaft (20) and opens at opposite ends thereof, so that the shaft is pressure-balanced in the axial direction.

12. A flow regulator according to claim 10, characterized in that the end of the center shaft (20) at said outlet (29) is inserted into a cavity (30) in a closing body (31) which is adjustable in the longitudinal direction of the center shaft (20), the cavity (30) having an outlet opening (32) which is directed towards the control element piston (4) and is arranged to cooperate with a seat (34) in order to close the outlet (29) to cause closing of the throttle valve (10).

13. A flow regulator according to claim 4, characterized in that the prestressing spring (9) is constrained between the outlet end of the closing body (31) and a support member (35) at the end of the center shaft (20), so that the prestressing force of the spring (9) is reduced with movement of the closing body (31) in the direction towards said seat (34).

14. A flow regulator according to claim 9, characterized in that the throttle valve (10) comprises a housing (39) having a cylindrical cavity (37) wherein the valve body (19) is slidably arranged and which merges into the outlet opening (39) of the regulator, the downstream end of the cavity (37) communicating with said flow channel (2) through a number of radial ports (40) which are symmetrically arranged in the peripheral wall of the housing (36).

15. A flow regulator according to claim 2, characterized in that the throttle valve (10) comprises a housing (39) having a cylindrical cavity (37) wherein the valve body (19) is slidably arranged and which merges into the outlet opening (39) of the regulator, the downstream end of the cavity (37) communicating with said flow channel (2) through a number of radial ports (40) which are symmetrically arranged in the peripheral wall of the housing (36).

16. A flow regulator according to claim 1, characterized in that the valve body (19) of the throttle valve (10) is provided with through-going axial channels (42) for equalizing the pressure difference between the end surfaces of the valve body (19).

17. A flow regulator according to claim 9, characterized in that the valve body (19) of the throttle valve (10) is provided with through-going axial channels (42) for equalizing the pressure difference between the end surfaces of the valve body (19).

18. A flow regulator according to claim 1, characterized in that the throttle valve (10) comprises a housing (39) having a cylindrical cavity (37) wherein the valve body (19) is slidably arranged and which merges into the outlet opening (39) of the regulator, the downstream end of the cavity (37) communicating with said flow channel (2) through a number of radial ports (40) which are symmetrically arranged in the peripheral wall of the housing (36).

19. A flow regulator for maintaining a smooth and stable rate of flow of a liquid in a flow channel under a relatively high pressure, e.g. 100–300 bars, comprising a flow actuated element (4) which is moveable under the influence of a pressure drop in the liquid flow, and which is influenced by a preset force acting oppositely to the flow direction, so that the element is only moved when the rate of flow exceeds a preselected level, a pressure-balanced throttle valve (10) having a valve body (19) for regulating the liquid flow under the influence of the flow-actuated element (4), and a servo means (11) which is connected between the flow-actuated element (4) and the throttle valve (19), said element constituting a control element for the servo means, the servo means (11) comprising a pressure-balanced pilot valve (17) arranged to cooperate with a drive means (13, 14, 18) in such a manner that the drive means after a time delay follows the movement of the control element without exertion of any counter-acting force on the control element, the drive means being rigidly connected to the valve body (19) of the throttle valve (10) to slave-control the valve body so that the movement thereof after said time delay corresponds to the movement of the flow-actuated element.

20. A flow regulator according to claim 1, wherein said control element (4) is influenced by a prestressed spring providing said preset force on the control element.

* * * * *